Feb. 22, 1966        M. H. PELAVIN        3,236,148
APPARATUS FOR PRODUCING DIRECT READINGS OF
CONCENTRATIONS OF CONSTITUENTS OF LIQUIDS

Filed Aug. 1, 1962        2 Sheets-Sheet 2

INVENTOR.
MILTON H. PELAVIN
BY *Harry Cole*
ATTORNEY

United States Patent Office 3,236,148
Patented Feb. 22, 1966

3,236,148
APPARATUS FOR PRODUCING DIRECT READINGS OF CONCENTRATIONS OF CONSTITUENTS OF LIQUIDS
Milton H. Pelavin, Greenburgh, N.Y., assignor to Technicon Instruments Corporation, Chauncey, N.Y., a corporation of New York
Filed Aug. 1, 1962, Ser. No. 214,080
4 Claims. (Cl. 88—14)

This invention relates to recorders and chart paper therefor and, more particularly, to a method and apparatus for providing direct reading curves of concentrations of constituents of liquids which are colorimetrically analyzed.

One of the objects of the present invention is to provide a method and apparatus for recording the results of the colorimetric analysis of a liquid stream, or a series of liquid samples, to obtain curves of values directly indicating concentrations of constituents of the liquid, in a manner such that the time consuming and tedious operations heretofore required to convert light transmittance values into concentrations are eliminated.

Another object is to provide a recorder and chart paper therefor which are operable in conjunction with a colorimetric analysis apparatus for providing curves directly indicating concentrations of substances in liquids.

Another object is generally to provide recording apparatus of improved construction and an improved method of obtaining curves of concentration values of constituents of liquids.

The above and other objects, features and advantages of the invention will be more fully understood from the following description of the invention considered in connection with the accompanying illustrative drawings of the presently preferred embodiment of the invention.

Figure 1:
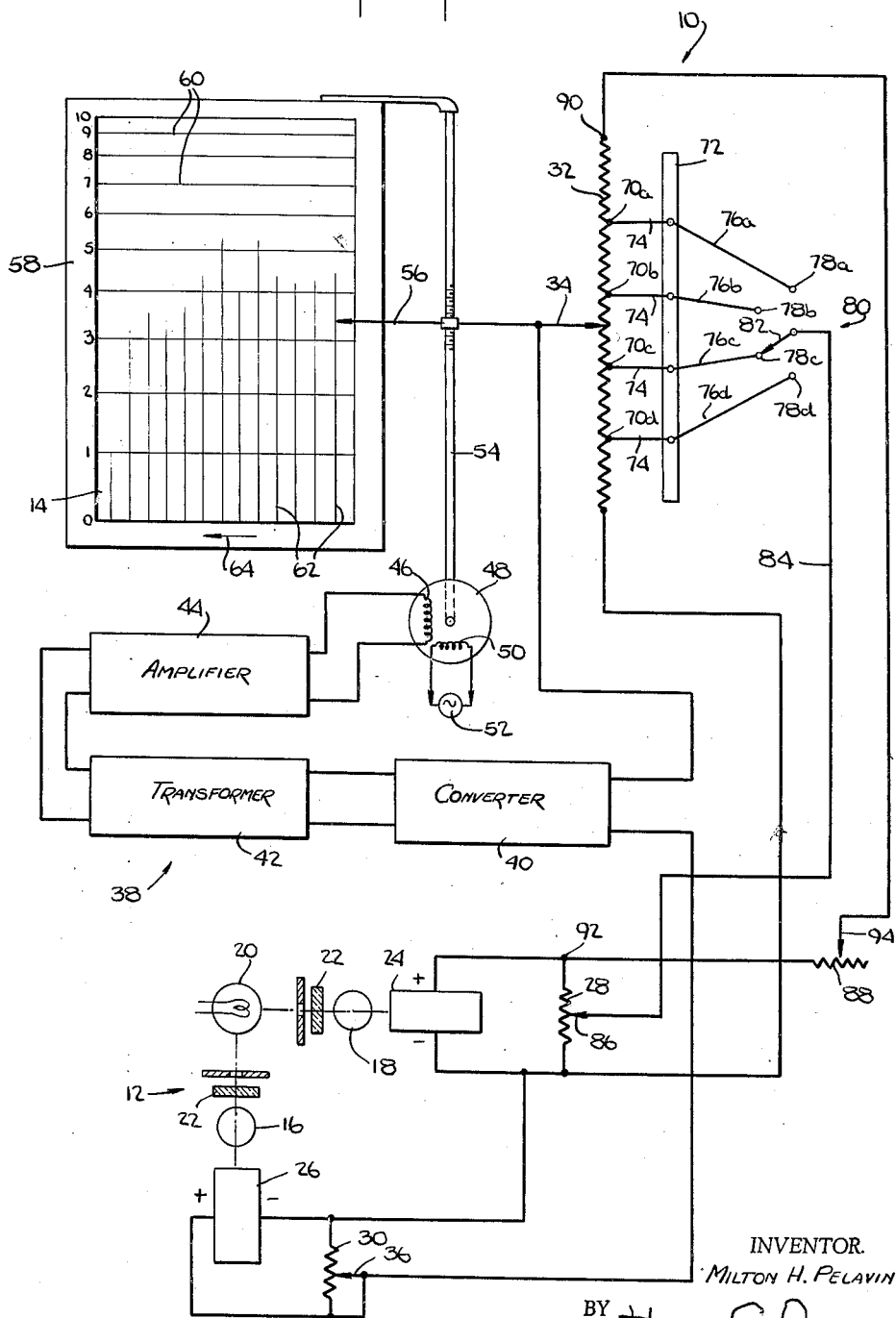
FIG. 1 is a schematic illustration of a recording apparatus in accordance with the present invention.

Referring now to the drawings in detail, the recorder 10 of the present invention is of the type shown in my U.S. Patent No. 3,031,917 issued May 1, 1962 and is operable to record the results of the operation of a colorimeter 12 to provide a series of curves on the recorder chart paper 14 which directly indicates the concentration of a substance in a liquid, or series of liquid samples, which pass through the flow cell 16 of the colorimeter. As explained in my U.S. patent, the colorimeter includes a colorless reference medium 18 having a 100% light transmittance characteristic. Light from the source 20 is focused on the reference medium and flow cell, and filters 22 are provided for providing light of the proper wave length in accordance with the constituent for which the liquid is being analyzed. The unabsorbed light is transmitted to the photoelectric devices 24 and 26, herein shown as photovoltaic cells, which are provided with load resistances 28 and 30, respectively, across which voltages are provided in accordance with the response of said photoelectric devices. The load resistances are connected in a null-type current ratio balancing system which compares the responses of the photoelectric devices to obtain a value which directly indicates the concentration of the substance in the liquid which is transmitted through the sample flow cell 16.

The null-type balancing circuit includes a slide wire potentiometer 32 which is connected across load resistance 28 and has a movable tap 34 which moves in response to the unbalance between the responses of the photoelectric devices. Load resistance 30 is in the form of a slide wire and is provided with a movable tap 36 and the voltages at taps 34 and 36 are transmitted to a balancing system 38 for the balancing operation. The balancing system includes a vibrating reed converter 40 which is coupled by a transformer 42 to an amplifier 44. The output of the amplifier is applied to one-phase winding 46 of a two-phase motor 48, the other winding 50 of the motor being energized by the A.C. source 52. The shaft 54 of the motor drives the slide wire tap 34 to balance the null-type current ratio circuit and the shaft also drives the stylus 56 of the recording apparatus. The stylus is mechanically coupled to a tap 34 and thereby is movable therewith.

In accordance with the invention, the recorder chart paper 14 is provided with an ordinate scale 58 of concentration values expressed in any convenient manner, for example milligrams-percent as illustrated herein. As is well understood, the different milligram-percent concentration units of the ordinate scale 58 represents the number of milligrams of the constituent in 100 milligrams of the liquid which is undergoing analysis and for simplicity, the concentration of the constituent will be hereinafter referred to as units of concentration, it being understood that a unit represents 1 milligram of constituent in 100 milligrams of liquid.

In addition to the ordinate scale, the recorder chart paper is provided with a series of parallel horizontal lines 60 representing concentration units. The lines are spaced from each other in the direction of movement of the stylus 56. The spacings 61 between lines 60 are unequal and are in decreasing order in a direction which extends from low values of concentration to high values of concentration. A series of vertical equally spaced lines 62 extend transversely of the concentration unit lines 60 and represent periods of time, it being understood that the chart paper moves longitudinally, in the direction of arrow 64 at a constant linear rate of speed.

The positions of the concentration unit lines 60 are established in the following manner with the selector switch 82 disengaged. A series of standards having different known concentrations of a known constituent is transmitted, in succession, through the sample flow cell 16 and the maximum excursion or position of the stylus 56 for each of the different standards is noted. These different positions of the stylus for the different concentrations establish the correct positions of the concentration unit lines for the chart paper. The chart paper is then printed having concentration unit lines 60 positioned thereon at the positions previously determined with the standards.

Figure 3:
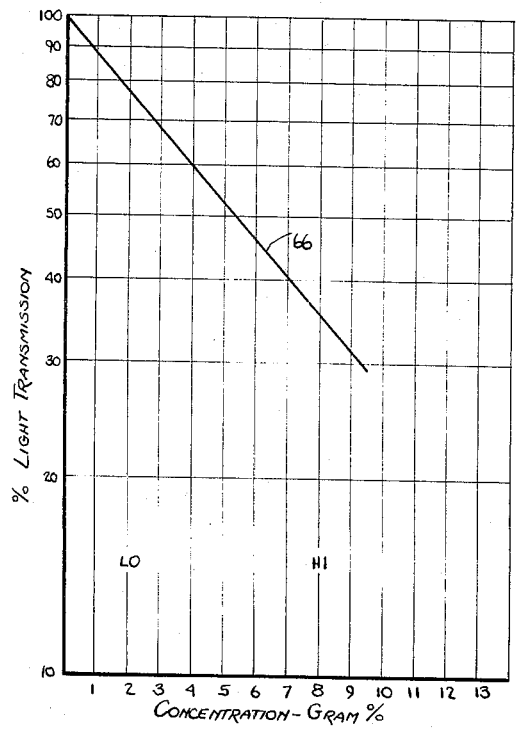
FIG. 3 is a calibration curve of the recorder.

A calibration curve 66, as shown in FIG. 3, can also be simultaneously provided on semi-log paper showing the relation between light transmission and concentration. It is to be noted that curve 66 is a straight line when plotted on semi-log paper since, as is well understood, the relation between light transmission and concentration is logarithmic in accordance with Beer's law.

In accordance with the invention, the recorder includes means operable to provide direct readings of concentrations for a variety of constituents, for example, protein, urea, nitrogen, glucose, calcium, etc., content of blood. More specifically, slide wire 32 is provided with an adjustable tap means including a series of tap points 70a, 70b, 70c and 70d and each of these tap points is connected to a terminal strip 72 by jumpers 74. A series of conductors 76a, 76b, 76c and 76d are connected, at one of their ends, to the corresponding connections on the terminal strip, and their opposite ends provide stationary contacts 78a, 78b, 78c and 78d of a switch 80 having a movable contact 82. The movable contact of the switch is connected by conductor 84 to a tap 86 which is movable along the length of slide wire 28. Switch 80 is operable to select the proper tap point for the specific test, thereby expanding the scale of the recorder, as will be more clearly understood hereinafter.

A variable resistor 88 is connected in series with slide wire 32 between terminal end 90 of the slide wire and the terminal positive end 92 of slide wire 28. Resistor 88 controls the current flow through the portion of slide wire 32 between terminal end 90 and the preselected tap point for reasons which will be more clearly understood hereinafter. The operation of the apparatus will now be described.

A calibration curve, such as curve 66 in FIG. 3, is established in the manner described above with a series of standards having known concentrations of a known constituent and with movable contact 82 of switch 80 disengaged from contacts 78. In the illustrated example, the test is for the protein content of blood or blood serum and high and low concentration standards are selected to bracket the range of concentrations which are expected to be encountered. The stylus positions corresponding to the high and low concentration standards are noted and, as illustrated in FIG. 3, the expected low concentration is 2 units while the expected high concentration is 8 units. Movable contact 82 of the selector switch 80 is moved to contact the tap point which corresponds to the stylus position for the expected high concentration or expanded full scale value. The position of tap 94 for variable resistance 88 is set approximately at its mid-point. Slide wire or load resistor 28 has a low resistance and is a source of voltage for the tap points. The position of tap 86 is selected so that the voltage at the selected tap point corresponds to the portion of the voltage across the slide wire 32 at said tap point.

A solution having a 100% light transmission characteristic is placed in flow cell 16 of the colorimeter and tap 36 is adjusted so that stylus 56 moves to a position which corresponds to the 100% light transmission position or 0 concentration at the bottom of chart 14. A high concentration standard, which has a concentration of 8 in the illustrative example for protein, is transmitted through the flow cell 16 and tap 86 is adjusted when the stylus is at its peak position so that the stylus is at the correct concentration position of 8 as indicated on the chart paper. A low concentration standard, which has a concentration of 2 in the present illustrative example for protein, is then transmitted through the flow cell 16 and tap 94 is adjusted when the stylus is at its peak position so that it is at the position corresponding to the concentration of 2 as indicated by the chart paper. The foregoing adjustments or standardization operations are preferably done from day to day to obviate any minor variations which might occur from one day to the next or from one week to the next. Movement of tap 94 does not substantially affect the voltage at the preselected tap point because of the relatively high resistance of slide wire 32 in comparison to the relatively low resistance of slide wire 28, the resistance of slide wire 32 being in the order, for example, of 4,000 ohms, with the resistance of slide wire 28 being in the order of 100 ohms.

The recorder is now in position for operation to provide direct readings of the protein concentration in a series of liquid samples which are continuously transmitted to the flow cell 16 of the colorimeter, in the form of a stream of separate samples, as described for example in U.S. Patent No. 2,797,149 issued June 25, 1957, although it will be understood that it is within the scope of the invention to provide a continuous liquid stream to flow cell 16, as in the case of a monitoring operation.

Figure 2:
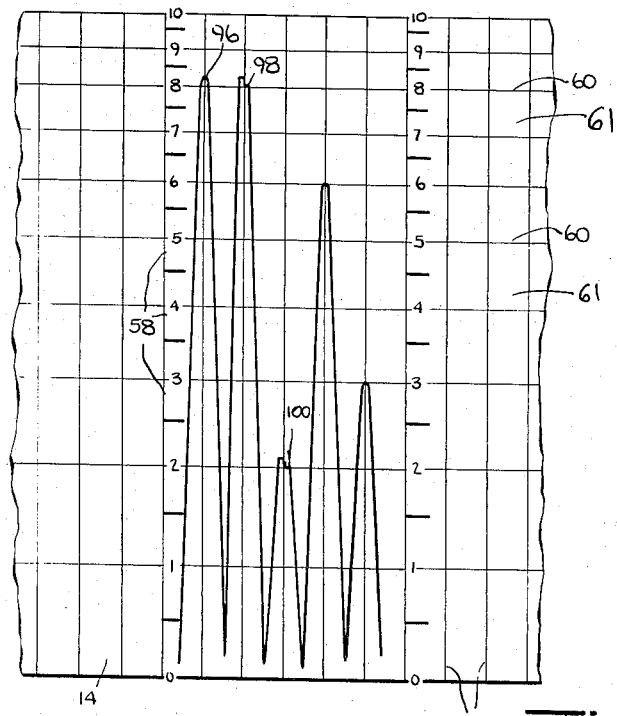
FIG. 2 is an illustration of a portion of the recorder chart paper used with the recorder of the present invention.

The above described adjustment operations and their effect on the position of the stylus can be readily seen from the curves of FIG. 2. The standard having a known concentration of 8 produced a peak 96 which was slightly above the 8 position on the recorder chart paper. A succeeding standard having a known concentration of 8 also moved the stylus to the same position and, upon adjusting operation of tap 86, the stylus was moved to its correct position at 98. Similarly, a standard having a low concentration of 2 moved the stylus to a position which was slightly above the correct position on the chart paper and, upon adjusting operation of tap 94, the stylus was moved to its correct position at 100. The remaining two curves have peak values of 6 and 3, respectively, which indicate that the samples corresponding to these curves had protein concentrations of 6 and 3, respectively.

For another type of analysis, as for example in the determination of the albumin content of blood, the positions of the stylus with respect to the high and low concentrations which are to be expected are determined, as explained above, and tap 82 of selective switch 80 is moved to contact the tap point 70 which corresponds to the position of the stylus for the high concentration value. In other words, selector switch 80 is operable to select the proper tap point of slide wire 32 for the specific analysis and tap 86 is operable to provide the proper voltage at said tap point.

While I have shown and described the preferred embodiment of the invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

What is claimed is:

1. Apparatus for recording the concentration of a substance in a sample liquid by comparing the light received from the sample liquid with the light received from a reference and recording the concentration on a chart paper which is advanced with respect to time in a first direction by a stylus which is traversed in a second direction perpendicular to said first direction, comprising: a first photoelectric device for providing a voltage which varies in response to the light from said reference; a second photoelectric device for providing a voltage which varies in response to the light from the sample liquid; a null type current ratio balancing system operable in response to said voltages for traversing said stylus; said chart paper having at least one scale of substance concentration values represented thereon with an axis parallel to said second direction; a first load resistor, having a movable tap means, coupled across the voltage output terminals of said first photoelectric device; said balancing system including a slidewire photentiometer having a first selectable fixed tap means and a second movable tap means, coupled in parallel with said first load resistor, said first tap means of said slidewire potentiometer being connected to said movable tap means of said first load resistor, said second movable tap means of said slidewire potentiometer being electrically connected to one of the inputs of said null-type current ratio balancing system and mechanically coupled to said stylus; whereby said movable tap means of said first load resistor and said first tap means of said slidewire potentiometer are presettable to determine the maximum concentration value to be recorded.

2. Apparatus for recording the concentration of a substance in a sample liquid by comparing the light received from the sample liquid with the light received from a reference and recording the concentration on a chart paper which is advanced with respect to time in a first direction by a stylus which is traversed in a second direction perpendicular to said first direction, comprising: a first photoelectric device for providing a voltage which varies in response to the light from said reference; a second photoelectric device for providing a voltage which varies in response to the light from the sample liquid;

a null type current ratio balancing system operable in response to said voltages for traversing said stylus; said chart paper having at least one scale of substance concentration values represented thereon with an axis parallel to said second direction; a first load resistor, having a movable tap means, coupled across the voltage output terminals of said first photoelectric device; said balancing system including a slidewire potentiometer having a first selectable fixed tap means and a second movable tap means, coupled in parallel with said first load resistor, said first tap means of said slidewire potentiometer being connected to said movable tap means of said first load resistor, said second movable tap means of said slidewire potentiometer being electrically connected to one of the inputs of said null type current ratio balancing system and mechanically coupled to said stylus; whereby said movable tap means of said first load resistor and said first tap means of said slidewire potentiometer are presettable to determine the maximum concentration value to be recorded; said first load resistor having an ohmic value which is several magnitudes smaller than the ohmic value of said slidewire potentiometer.

3. Apparatus for recording the concentration of a substance in a sample liquid by comparing the light received from the sample liquid with the light received from a reference and recording the concentration on a chart paper which is advanced with respect to time in a first direction by a stylus which is traversed in a second direction perpendicular to said first direction, comprising: a first photoelectric device for providing a voltage which varies in response to the light from said reference; a second photoelectric device for providing a voltage which varies in response to the light from the sample liquid; a null type current ratio balancing system operable in response to said voltages for traversing said stylus; said chart paper having at least one scale of substance concentration values represented thereon with an axis parallel to said second direction; a first load resistor, having a movable tap means, coupled across the voltage output terminals of said first photoelectrical device; said balancing system including a slidewire potentiometer having a first selectable fixed tap means and a second movable tap means, coupled in parallel with said first load resistor, said first tap means of said slidewire potentiometer being connected to said movable tap means of said first load resistor, said second movable tap means of said slidewire potentiometer being electrically connected to one of the inputs of said null type current ratio balancing system and mechanically coupled to said stylus; whereby said movable tap means of said first load resistor and said first tap means of said slidewire potentiometer are presettable to determine the maximum concentration value to be recorded; and adjustable resistance means connected in series with said slidewire potentiometer; whereby said adjustable resistance means is presettable to determine the minimum concentration value to be recorded.

4. Apparatus for recording the concentration of a substance in a sample liquid by comparing the light received from the sample liquid with the light received from a reference and recording the concentration on a chart paper which is advanced with respect to time in a first direction by a stylus which is traversed in a second direction perpendicular to said first direction, comprising: a first photoelectric device for providing a voltage which varies in response to the light from said reference; a second photoelectric device for providing a voltage which varies in response to the light from the sample liquid; a null type current ratio balancing system operable in response to said voltages for traversing said stylus; said chart paper having at least one scale of substance concentration values represented thereon with an axis parallel to said second direction; a first load resistor, having a movable tap means, coupled across the voltage output terminals of said first photoelectrical device; said balancing system including a slidewire potentiometer having a first selectable fixed tap means and a second movable tap means, coupled in parallel with said first load resistor, said first tap means of said slidewire potentiometer being connected to said movable tap means of said first load resistor, said second movable tap means of said slidewire potentiometer being electrically connected to one of the inputs of said null type current ratio balancing system and mechanically coupled to said stylus; whereby said movable tap means of said first load resistor and said first tap means of said slidewire potentiometer are presettable to determine the maximum concentration value to be recorded; said first tap means of said slidewire potentiometer comprising a plurality of spaced apart fixed taps and a switch operable for connection to any one of said fixed taps; whereby said switch is operable to select a predetermined tap of the slidewire potentiometer for the liquid being analyzed and said movable tap means of said first load resistor is operable to provide a predetermined voltage to said selected tap.

References Cited by the Examiner
UNITED STATES PATENTS

| | | | |
|---|---|---|---|
| 1,124,510 | 1/1915 | Pestel | 346—136 |
| 1,513,214 | 10/1924 | Betts | 346—136 |
| 1,843,572 | 2/1932 | MacGahan | 346—1 |
| 2,048,554 | 7/1936 | Kuder | 88—14 |
| 2,582,793 | 1/1952 | Perry | 346—1 |
| 2,960,910 | 11/1960 | Pelavin | 88—14 |
| 2,980,894 | 4/1961 | Lindemann | 324—99 |
| 3,020,793 | 2/1962 | Newbrech et al. | 88—14 |
| 3,031,917 | 5/1962 | Pelavin | 88—14 |
| 3,033,036 | 5/1962 | Leisey | 88—14 |
| 3,087,115 | 3/1963 | Dawe et al. | 324—115 |

FOREIGN PATENTS 1,113,139  8/1961  Germany.

JEWELL H. PEDERSEN, *Primary Examiner.*

LEO SMILOW, *Examiner.*

J. W. HARTARY, O. B. CHEW, *Assistant Examiners.*